US007724702B2

(12) United States Patent
Silverman et al.

(10) Patent No.: US 7,724,702 B2
(45) Date of Patent: May 25, 2010

(54) MULTIPLE CONFIGURATION COMMUNICATION APPARATUS

(75) Inventors: Shmuel Silverman, Buffalo Grove, IL (US); Mark J. Johnson, Cary, IL (US); Adam C. Lewis, Buffalo Grove, IL (US); Ron Rotstein, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 649 days.

(21) Appl. No.: 11/303,492

(22) Filed: Dec. 16, 2005

(65) Prior Publication Data

US 2007/0140161 A1 Jun. 21, 2007

(51) Int. Cl.
*H04W 4/00* (2009.01)

(52) U.S. Cl. ...................................................... 370/329

(58) Field of Classification Search .................. 455/63, 455/447, 442, 91, 566, 414, 456, 41.1, 458, 455/452.1, 63.2, 450; 370/329, 331
See application file for complete search history.

(56) References Cited

U.S. PATENT DOCUMENTS 6,477,382 B1 * 11/2002 Mansfield et al. ........... 455/458
6,865,387 B2 3/2005 Bucknell
6,954,446 B2 10/2005 Kuffner
2004/0203694 A1 10/2004 Wong
2005/0190747 A1 * 9/2005 Sindhwani et al. .......... 370/352
2006/0013159 A2 * 1/2006 Gurevich .................... 370/328
2006/0052055 A1 * 3/2006 Rowse et al. ............... 455/41.1
2006/0205414 A1 * 9/2006 Teague .................... 455/452.1
2006/0293076 A1 * 12/2006 Julian et al. ................. 455/522

OTHER PUBLICATIONS

PCT Search Report Dated Nov. 7, 2007.

* cited by examiner

*Primary Examiner*—Melody Mehrpour
(74) *Attorney, Agent, or Firm*—Valerie M. Davis

(57) ABSTRACT

Multiple-configuration communication apparatus includes: a communication device (130) simultaneously maintaining at least a first and a second channel; a storage device (114, 116, 118) storing a plurality of communication configurations; and a configuration controller (120) determining a first time frame and during the first time frame, selecting a first communication configuration of the plurality of communication configurations and controlling the communication device to configure itself to the first communication configuration to at least one of transmit and receive information over the first channel, and determining a second time frame that is different from the first time frame and during the second time frame, selecting a second communication configuration of the plurality of communications configurations, and controlling the communication device to configure itself to the second communication configuration to at least one of transmit and receive information over the second channel.

20 Claims, 5 Drawing Sheets

202 — ESTABLISHING AND SIMULTANEOUSLY MAINTAINING A FIRST CHANNEL AND AT LEAST A SECOND CHANNEL

204 — DETERMINING A FIRST TIME FRAME

206 — DURING THE FIRST TIME FRAME, SELECTING A FIRST COMMUNICATION CONFIGURATION, CONTROLLING COMMUNICATION APPARATUS TO CONFIGURE ITSELF TO THE FIRST COMMUNICATION CONFIGURATION, AND/OR TRANSMITTING OR RECEIVING INFORMATION OVER THE FIRST CHANNEL

208 — DETERMINING A SECOND TIME FRAME

210 — DURING THE SECOND TIME FRAME, SELECTING A SECOND COMMUNICATION CONFIGURATION, CONTROLLING COMMUNICATION APPARATUS TO CONFIGURE ITSELF TO THE SECOND COMMUNICATION CONFIGURATION, AND/OR TRANSMITTING OR RECEIVING INFORMATION OVER THE SECOND CHANNEL

200

MULTIPLE CONFIGURATION COMMUNICATION APPARATUS

FIELD OF THE INVENTION

The present invention relates generally to communication technology and more specifically to apparatus generally having a single instantiation of a radio device that is configurable to maintain multiple channels while switching between a plurality of communication configurations stored in the apparatus in order to transmit and receive information over the multiple channels at different times.

BACKGROUND OF THE INVENTION

As the number of communication units (e.g., laptops, Personal Digital Assistants (PDAs), cellular telephones, mobile and portable radios, etc.) in use continues to increase, this places a continued strain on already limited communication resources. To assist users of communication units in more effectively utilizing the limited communication resources, communication units have been designed to use multiple (i.e., two or more) communication protocols (e.g., 802.11, Bluetooth, various cellular protocols) and/or associated modulation techniques (e.g., CDMA (code-division multiple access), TDMA (time-division multiple access), OFDM (orthogonal frequency division multiplexing), etc.) to transmit information from and receive information to the communication unit. Such communication units are sometimes referred to as "multi-mode" or "multi-function" units and are typically implemented in one of two ways.

In the first implementation, the communication unit comprises multiple instantiations of radio apparatus, wherein each radio apparatus is configured to implement a different communication protocol and/or modulation technique. The unit can maintain multiple channels simultaneously. However, each radio in the unit is typically already pre-programmed for its intended use, so the number of physical radios that the unit contains limits the number of "modes" or "functions" that the radio may implement. In the second implementation, the communication unit comprises a single instantiation of radio apparatus which is configurable typically based on software stored in the radio. However, the radio apparatus can only maintain a single channel at any given time, wherein that channel corresponds to the mode in which the radio is currently configured. Therefore, if other functions are required, an application or user must decide whether to maintain any sessions or connections that are based on the current configuration, or to drop those sessions or connections and reconfigure the device to support others.

It would be advantageous for a communication unit to having a single instantiation of radio apparatus while being configurable for simultaneously maintaining and communicating over multiple channels. It would be further desirable that the limitations of the number of "modes" in which the radio can operate is limited primarily by the software stored on the unit for controlling its configuration into these various different modes.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF EMBODIMENTS OF THE INVENTION

Figure 1:
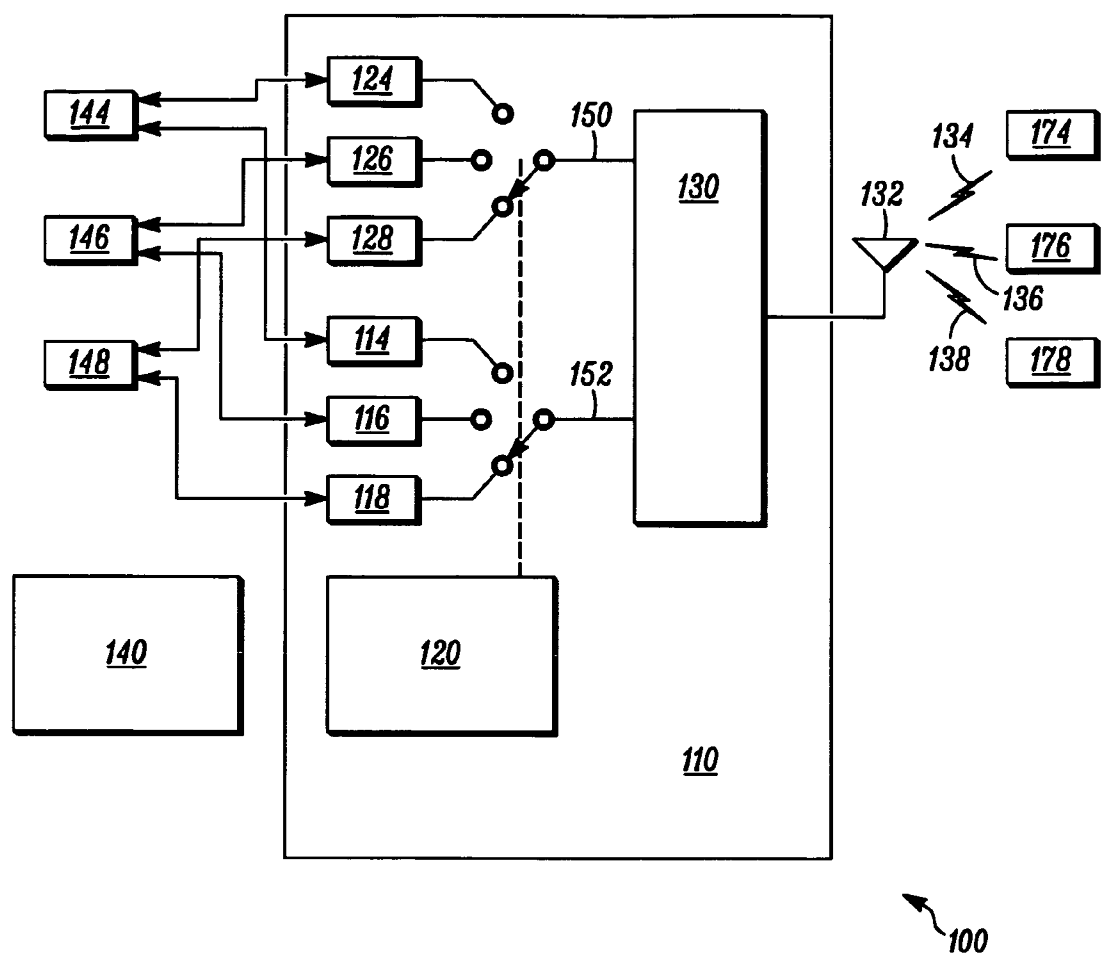
FIG. 1 illustrates multiple-configuration communication apparatus in accordance with an embodiment of the present invention.

Before describing in detail embodiments that are in accordance with the present invention, it should be observed that the embodiments reside primarily in combinations of method steps and apparatus components related to a method and apparatus for multiple-configuration communication apparatus. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for multiple-configuration communication apparatus described herein. The non-processor circuits may include, but are not limited to, a radio receiver, a radio transmitter, signal drivers, clock circuits, power source circuits, and user input devices. As such, these functions may be interpreted as steps of a method performed in the multiple-configuration communication apparatus described herein. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the invention provides a method of supporting multiple applications with distinct requirements for a communications unit with a single hardware communication device, e.g., a radio. In accordance with embodiments described herein, multiple communication configurations are stored in a communication unit. Although only one configuration will typically be active at a particular time, the single hardware device can simultaneously maintain multiple connections or channels by using handshaking, sleep modes, error tolerance properties, or other features of selected protocols, and switch between configurations associated with the simultaneously maintained connections at a rate sufficient to keep all connections active. In this way, applications using the single hardware device may behave as though they have complete control of it—not only of information or paths, as is typical in modem operating systems, but over the configured properties of the device. A scheduling algorithm generally controls which of the configurations is active at a given time.

Moreover, current work in the area of software-defined radio (SDR) extends the value of the embodiments described herein even further, since an SDR is capable of supporting multiple systems and protocols depending on how it is configured. More particularly, the embodiments described herein enable a single SDR to support multiple systems simultaneously. As SDR becomes more prevalent in portable and computer devices, a single radio included in, for example, a PDA/cellular device can be designed to support a plurality of active networks such as, for instance, a WLAN (Wireless Local Area Network), a Bluetooth network, a cellular network, etc. and even provide bridging between these networks.

Those skilled in the art will realize that the above recognized advantages and other advantages described herein are merely exemplary and are not meant to be a complete rendering of all of the advantages of the various embodiments of the present invention.

Referring now to the drawings, and in particular FIG. 1, a multiple-configuration communication unit in accordance with an embodiment of the present invention is shown and indicated generally at 100. Communication unit 100 may comprise, for example, a subscriber unit (such as a PDA, cellular telephone, portable device, mobile device, etc.) or a base station also known in the art as a base radio. Communication unit 100 contains a hardware peripheral 110 similar to a SDR, which is capable of supporting multiple communication configurations, wherein a communication configuration is characterized by software applications and data required to program peripheral 110 to communicate on a given network using a given communication protocol. In the particular embodiment illustrated, unit 100 supports three communication configurations for ease of illustration. However, those of ordinary skill in the art will realize that unit 100 can be configured to support any number of communication configurations as determined, for instance, by design and/or user specification.

Accordingly, peripheral 110 comprises a communication device 130 such as a radio. In this embodiment, device 130 comprises a suitable transceiver (e.g., comprising a transmitter and a receiver not shown) and an antenna 132 operatively coupled together. Since transceivers and antennas and their operation are generally known in the art, a detailed description of such will not be included here for the sake of brevity. Device 130 simultaneously maintains connections or channels 134, 136 and 138, respectively, within networks 174, 176 and 178, which may comprise any available networks including, but not limited to, one or more WLANs. Those of ordinary skill in the art will realize that a commercial embodiment of communication device 130 generally comprises other elements not shown such as various processors (e.g., a digital signal processor or DSP), clocks, memory, baseband logic, etc. A channel as used herein refers to an instance of medium use for the purpose of passing information over the channel. The channel may be a wireline or wireless channel, such as a radio frequency (RF) channel. In this illustration, channels 134, 136 and 138 are all wireless RF channels, wherein information is generally sent over the channels in packets in accordance with associated respective wireless protocols.

In order for communication device 130 to establish and simultaneously maintain channels 134, 136 and 138, communication unit 100 has stored therein at least three communication configurations, with a different communication configuration supporting each of the three channels. In the illustrated embodiment, the three communication configurations comprise logical configuration blocks 114, 116 and 118 included in peripheral 110. Each of the configuration blocks contains configuration data needed to program or configure communication device 130 to transmit and/or receive information over one of the channels (e.g., 134, 136, 138) being maintained, using the associated protocol. The configuration data may comprise data related to, for example, modulation, rate, transmission power, channel, filter requirements, etc.

The three communication configurations further comprise (e.g., within peripheral 110) logical information or data paths 124, 126 and 128 coupled between communication device 130 and applications (e.g., 144, 146, 148) stored in unit 100 and that support the various communication configurations, through which the data (e.g., audio, video, etc.) being communicated by unit 100 will pass as it is communicated over the respective channels (e.g., 134, 136, 138). In one embodiment, for example, each data path and corresponding application is implemented as one or more layers of a protocol stack in accordance with the well known Open Systems Interconnect (OSI) model for processing the information transmitted from and received to communication unit 100. In other embodiments each corresponding application and data path may comprise a medium access control (MAC) engine (for instance in accordance with the well known 802.11 WLAN protocol and as described in an embodiment in more detail below), a driver, a user application, or any other entity capable of utilizing the communication peripheral 110.

The communication configurations including the data paths, configuration data and applications can be stored as data and/or software (as is required) in any suitable storage device or apparatus such as one or more read only memories, random access memories, etc. Unit 100 may comprise any suitable processor(s) (not shown) for implementing the various communication configurations stored therein. Depending on the device design requirements, applications 144, 146, 148 may interface to the peripheral 110 directly or they may be abstracted through, for instance, a driver or an application programming interface (API).

Peripheral 110 further comprises a configuration controller, which selects which communication configuration is active at any time and arbitrates the switching of hardware (any suitable hardware switching apparatus, e.g., 150, 152) from one configuration to another as needed. The configuration controller in the embodiment illustrated comprises a hardware portion 120 referred to herein as the "controller" and a software portion 140 referred to herein as the "scheduler." As mentioned above, data paths 124, 126, 128 are associated with configuration blocks 114, 116, 118 respectively. Controller 120 physically selects or switches to a given configuration block for configuring communication device 130 during a predetermined or prearranged time frame and further physically selects or switches to the corresponding data path associated with the selected configuration block. Thus, the communication device 130 may be configured using the data contained in the selected configuration block in order to communicate information via the associated selected data path.

Scheduler 140 programs controller 120 to select certain communication configurations and data paths at prearranged times. This arrangement allows the scheduler 140 to manage connections 134, 136, 138 to respective networks 174, 176, 178, and enables these channels to be simultaneously maintained with device 130 being present on each channel for only a fraction of the time. Scheduler 140 can be said to comprise a single hardware abstraction layer (HAL) servicing multiple communication configurations by being an interface between applications 144, 146, 148 and communication device 130 so that applications 144, 146, 148 can perform their functions asynchronously while device 130 operates in real time to receive and transmit information over channels 134, 136, 138.

To enable its functionality, scheduler 140 generally has some awareness of the protocols being used on networks 174, 176, 178 in order to arrange and interpret the times (e.g., time frames) that device 130's presence on each channel is required or optional. Thus, scheduler 140 uses its knowledge of one or more parameters of the protocols associated with channels 134, 136, 138 (or more particularly associated with communicating information in networks 174, 176, 178 over the respective channels) to determine and program controller 120 with configuration scheduling for communication device 130. The scheduling may be determined using any suitable scheduling algorithm stored on a storage device in unit 100. The configuration scheduling determined by the scheduling algorithm may in general comprise: a first time frame during which controller 120 switches to configuration block 114 and associated data path 124 for controlling communication device 130 to reconfigure itself to communicate information over channel 134; a second and different time frame during which controller 120 switches to configuration block 116 and associated data path 126 for controlling communication device 130 to reconfigure itself to communicate information over channel 136; and yet a third and different time frame during which controller 120 switches to configuration block 118 and associated data path 128 for controlling communication device 130 to reconfigure itself to communicate information over channel 138.

In one embodiment, this configuration scheduling is enabled by scheduler 140's awareness of inactive modes utilized in the protocols associated with each channel. As used herein an inactive mode associated with a channel that is being maintained is characterized by a time frame during which a communication unit is not required by the protocol to be active on the channel. Depending on a given protocol, the inactive mode may be implementing, for example, using slot assignments, polled modes, time division multiplexing, or other scheduling mechanisms if the device is a server on the channel, or by scheduling sleep modes or requesting specific availability intervals if the device is a client, or may be implemented using various power saving mechanisms. The scheduler 140 then programs controller 120 to ensure that a particular configuration 114, 116, 118 is active at the times when its network 174, 176 178 requires its presence on the channel 134, 136, 138.

Since scheduler 140 in effect serves as a HAL between applications 144, 146, 148 and device 130, these applications can program configurations 114, 116, 118 and communicate through data paths 124, 126, 128 without specific knowledge of which of the configurations 114, 116, 118 is currently active. In this manner, applications 144, 146, 148 each have access to the configurations 114, 116, 118 and the data paths 124, 126, 128 at will, regardless of which of the configurations 114, 116, 118 is currently active and are, consequently therefore, relieved of real-time maintenance activities. This level of abstraction enables applications 144, 146, 148 to operate as though they had complete control of the communication device 130 even though in reality each application is sharing the device with other applications.

Figure 2:
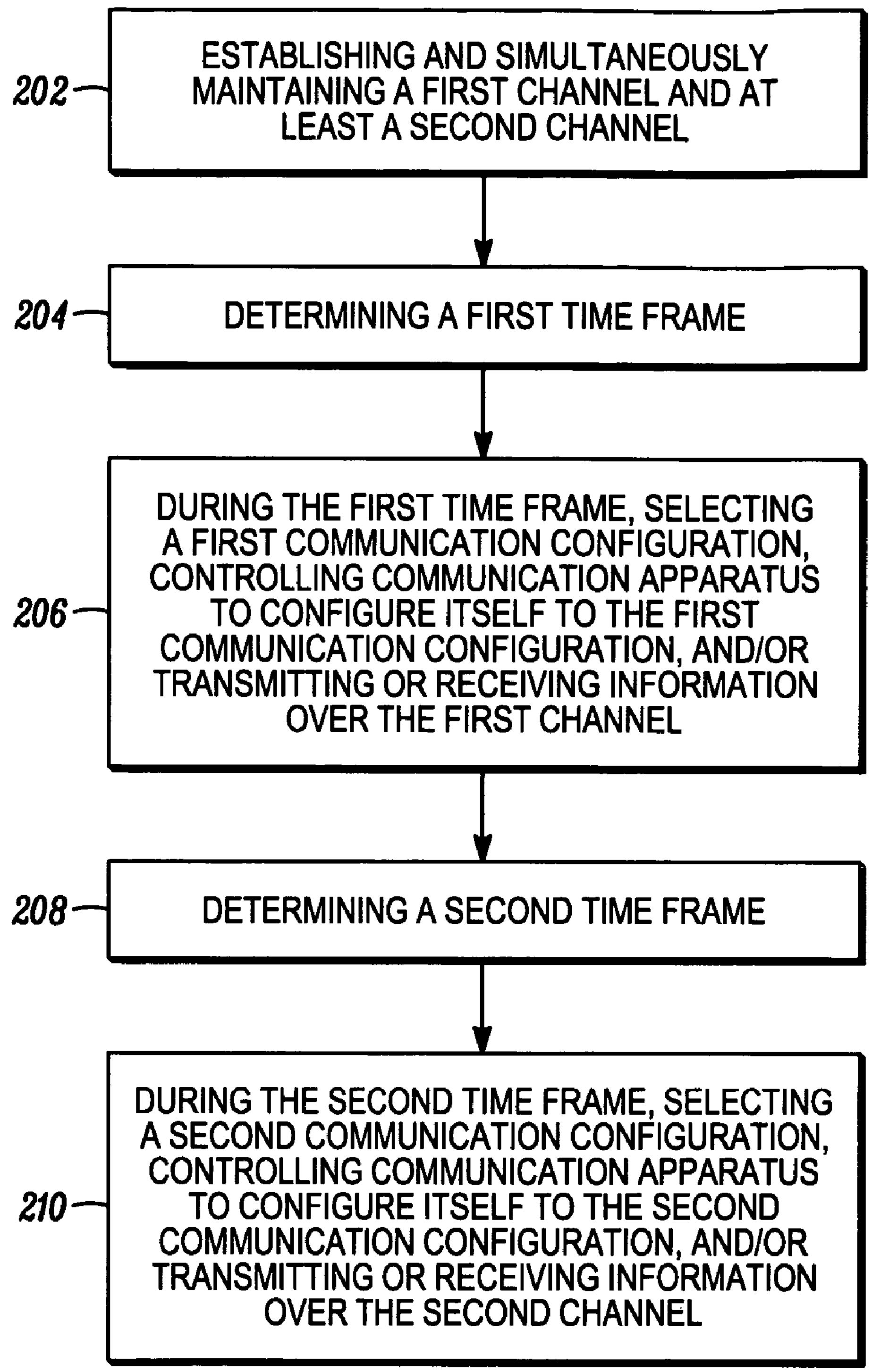
FIG. 2 illustrates a method performed in the apparatus of FIG. 1.

Turning now to FIG. 2, a method that may be performed in communication apparatus such as communication unit 100 is shown and generally indicated at 200. In communication unit 100, the method comprises the steps of: establishing and simultaneously maintaining (202) a first channel and at least a second channel using communication device 130; the scheduler 140 determining (204) a first time frame; during (206) the first time frame, the scheduler 140 selecting a first communication configuration of a plurality of communication configurations stored in the communication apparatus, the controller 120 controlling the communication device 130 to configure itself to the first communication configuration and the communication device 130 transmitting and/or receiving information over the first channel; the scheduler 140 determining (208) a second time frame that is different from the first time frame; and during (210) the second time frame, the scheduler 140 selecting a second communication configuration of the plurality of communication configurations, the controller 120 controlling the communication device 130 to configure itself to the second communication configuration and the communication device 130 transmitting and/or receiving information over the second channel. Those skilled in the art will realize that the unit 100, while operational, will continue to determine additional time frames over which to switch between communication configurations to communicate over the multiple channels that it has maintained.

Figure 3:
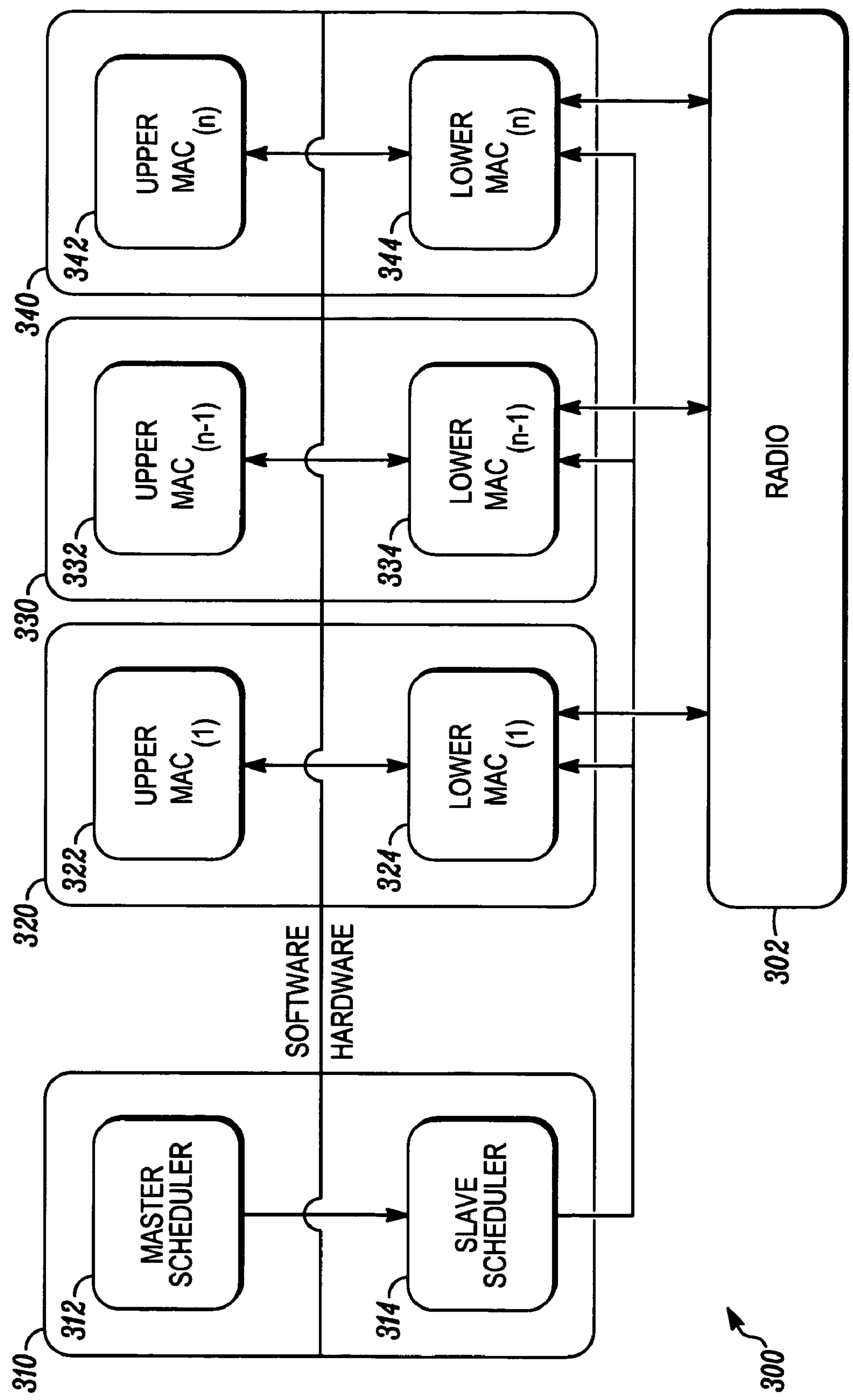
FIG. 3 illustrates multiple-configuration communication apparatus in accordance with another embodiment of the present invention.
Figure 4:
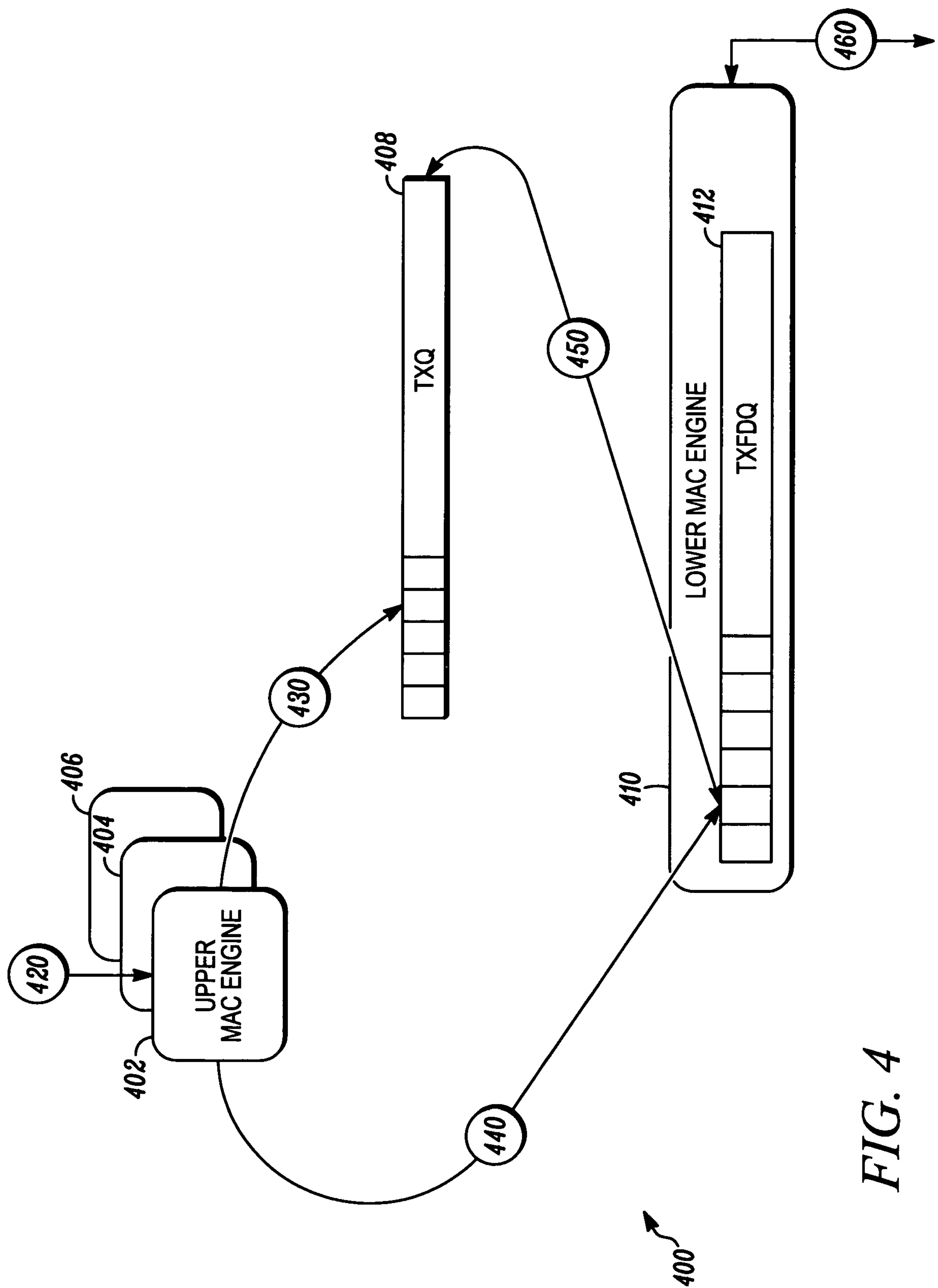
FIG. 4 illustrates a transmission flow for the apparatus of FIG. 3.
Figure 5:
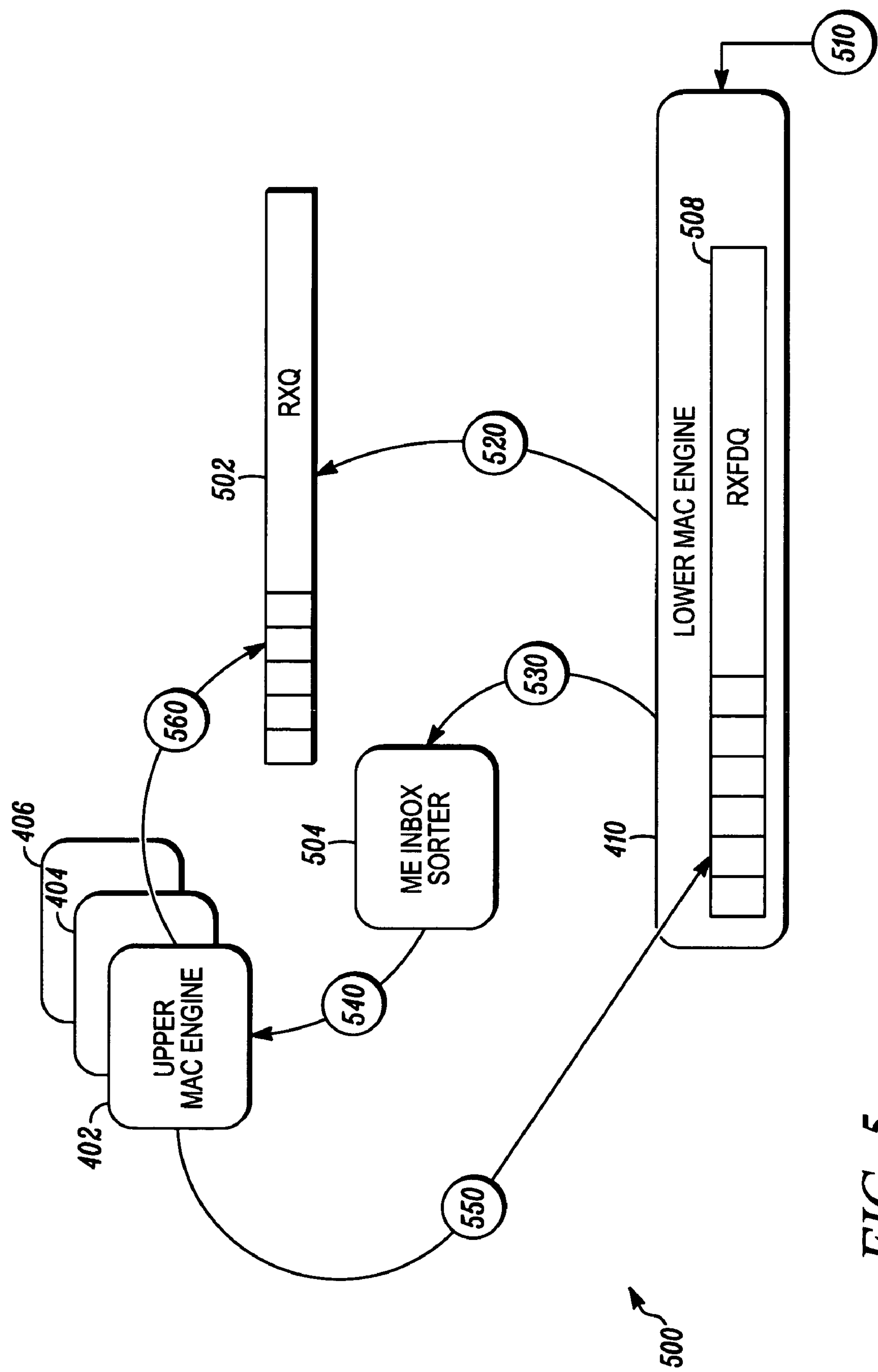
FIG. 5 illustrates a receive flow for the apparatus of FIG. 3.

The remaining FIGS. 3-5 illustrate a particular embodiment of the present invention including a specific implementation of apparatus 100 and method 200 in the context of 802.11 WLANs. Accordingly FIG. 3 shows, by way of example and not limitation, software definable and multiple-configuration radio communication apparatus 300 in accordance with another embodiment of the present invention. Apparatus 300 corresponds to peripheral 110 of FIG. 1 and comprises a radio 302 (corresponding to communication apparatus 130) and a configuration controller 310 that includes a master scheduler 312 (corresponding to scheduler 140) implemented in software and a slave scheduler 314 (corresponding to controller 120) implemented in hardware. Apparatus 300 further comprises a plurality of communication configurations stored therein and implemented as 802.11 MAC engines (three shown and denoted as 320, 330 and 330) operatively coupled to the slave scheduler 314 and the radio 302. Only three MAC engines are shown for ease of illustration. However, skilled artisans will realize that any number of MAC engines may be implemented in apparatus 300 as a function, for instance, of user and/or design specifications.

MAC engines 320, 330, 340 and associated switching apparatus (illustrated generally by arrows between the controller 314 and the MAC engines) correspond, respectively, to data paths 124, 126, 128. In general, each of the MAC engines is divided between hardware (e.g., denoted as Lower MAC (1) 324, Lower MAC (n−1) 334 and Lower MAC (n) 344, where n=3 in this case) and software (denoted as Upper MAC (1) 322, Upper MAC (n−1) 332 and Upper MAC (n) 342, where again n=3 in this case). Since software is inherently non-deterministic compared to hardware, operations requiring high-resolution timing are more appropriately handled in hardware. Accordingly, each software component handles complex but non real-time tasks (such as fragmentation and reassembly), while each hardware component handles simple but time-critical or real-time tasks (such as generation of an ACK frame, which must happen in short time). Each of the plurality of 802.11 MAC engines are operably connected to the single radio 302, which can serve only a single 802.11 MAC engine at a time.

In accordance with this embodiment, usually each lower MAC engine comprises of two queues, a transmit queue (or TX queue) and a reception queue (or RX queue), also referred to herein as TXQ and RXQ respectively. The TXQ and RXQ for each MAC engine may be common and shared in one embodiment or, alternatively, separate in another embodiment. Each upper MAC receives data payload from the corresponding application (e.g., 144, 146, 148 not shown in apparatus 300) for transmission over the wireless air interface (via the radio) and queues the data asynchronously to the TXQ in its corresponding lower MAC engine. Although all lower MAC engines can largely share the same lower MAC hardware, they usually have individual configurations and data paths, and appear to be multiple instantiations of identical lower MAC engines. For the purposes of this description, a lower MAC engine is described as being any of the multiple configurations and data paths associated with an upper MAC engine, regardless of the fact that they may share a large subset of the lower MAC hardware implementation.

To address the limitation that each MAC engine expects complete access to the radio, and being that the radio can only service a single MAC engine at a time, a fully asynchronous interface between the upper MACs and lower MACs (and/or) radio is desired to enable an effective separation between the time-critical and non-time critical tasks. Configuration controller 310 provides for this interface and as described above is, similarly to the MAC engines, partitioned into a software component 312 and a hardware component 314. The complex scheduling algorithm is implemented in what is hereinafter referred to as "the scheduler" corresponding to scheduler 140 in FIG. 1, and the hard real-time switching of MAC engines to access the radio is controlled in the hardware component of the configuration controller, corresponding to controller 120 in FIG. 1.

The scheduler is aware of constraints placed upon the 802.11 MAC layer protocol such as (but not limited to) contention periods, contention free (polling) periods, and/or power saving protocols. The scheduler then determines and programs the controller with a schedule of when to switch access control to which lower MAC engine. As such, the scheduler abstracts from the software and hardware MAC engines the constraints imposed by the single radio. That is to say that each upper MAC engine behaves as if it has complete access to the radio, e.g., the upper MAC engines run all the time without knowledge of which lower MAC engine is selected by the controller. However, in reality the controller 314 is switching the lower MAC engine to other configurations at various times in a deterministic way.

To enable transmission of data frames or data packets by radio 302, each upper MAC engine asynchronously queues data frames to its respective lower MAC engine (e.g., independent from the configuration scheduling determined by scheduler 312), and the lower MAC engine transmits the frames when the appropriate configuration is activated by the controller 314. In one embodiment, the configuration is comprised of configuration registers programmed by the upper MAC to define the operation of the lower MAC as well as any state information in the lower MAC that needs to be retained from one active period to the next.

FIG. 4 illustrates a data frame transmission flow for apparatus 300 in accordance with an embodiment of the present invention. Illustrated in FIG. 4, are three upper MAC engines 402, 404,406 and a lower MAC engine 410. It should be noted that since, as explained above, the three lower MAC engines corresponding to the three upper MAC engines largely share common hardware the lower MAC engine is represented as one hardware device. Also shown in FIG. 4 is a TXQ 408 and a transmission frame description queue (denoted TXFDQ 412) included in the lower MAC engine, both of which are common to all three MAC engines. To aid in communication between the upper and lower MAC engines for purposes of distinguishing between which data frames are generated by which upper MAC engines, a descriptor may be generated and used by both the upper MAC engine the lower MAC engine for this purpose.

The frame descriptor can have any format but usually at a minimum identifies the particular upper MAC engine generating or passing the frames (e.g., through the use of a MAC engine identification or ID) and identifies the priority of the frames. In this embodiment, priority of the frames may correspond to the frames' location in the TXQ 408. To facilitate such an embodiment, the TXFQD may be implemented as a doubly linked list to the upper MAC engine and the TXQ, to enable the upper MAC engine to insert the frame descriptor in its proper place in the TXFDQ, for example, using a linear sort.

Accordingly for transmission of data frames, at a step 420 the upper MAC engine (e.g., 402) receives data from upper layers (e.g., of the OSI model) for transmission by the radio. The upper MAC engine at a step 430 finds space in the TXQ 408 and inserts the frames therein. At a step 440, the upper MAC engine creates a descriptor with its ID and inserts the descriptor into the TXFDQ 412 (denoted as location 414 in the TXFDQ) as an indication to the lower MAC engine of the priority of the identified frames. Upon the configuration controller selecting the MAC engine comprising upper MAC engine 402, the lower MAC engine uses the descriptor 414 to locate the frames (at a step 450) in TXQ 408, wherein the lower MAC transfers these frames to the radio (at a step 460) for transmission by the radio over the associated channel.

Reception of frames from radio 302 follows a similar model. When a lower MAC configuration is given access to radio 302 by controller 314, it will spend part of its time "listening" instead of "talking." When frames are received, they will be passed up to the upper MAC engine which will in turn pass the data to the application. Once again, the reader will appreciate the level of abstraction between the radio and MAC engines, in that neither the lower MAC engine, the upper MAC engine nor the application is aware of the single radio of which they all share access.

FIG. 5 illustrates a data frame reception flow for apparatus 300 in accordance with an embodiment of the present invention. Illustrated in FIG. 5, are the three upper MAC engines 402, 404, 406 and the lower MAC engine 410. Also shown in FIG. 5 is a MAC engine (ME) inbox sorter 504, a RXQ 502 and a reception frame description queue (denoted RXFDQ 506) included in the lower MAC engine, all of which are common to all three MAC engines. Like the TXFDQ, the RXFDQ may be implemented as a doubly linked list. The ME inbox sorter 504 can be used to relieve each upper MAC engine of the responsibility for having to process reception or RX interrupts generated by the lower MAC engine and furthermore determine whether a given RX interrupt corresponds to frames that are available for processing by the upper MAC engine. The inbox sorter provides this functionality, thereby hiding such overhead from the upper MAC engines.

Accordingly for reception of data frames, the lower MAC engine receives frames from the radio at a step 510, searches for a location in the RXQ and inserts the frames into the RXQ 502 at a step 520 and inserts an appropriate descriptor in the RXFDQ 506 (as denoted by a location 508). Similarly to the transmission model, the descriptor identifies an upper MAC engine ID and priority of received frames in the RXQ 502. At a step 530, the lower MAC engine generates a RX interrupts that it sends to the ME inbox sorter 504, wherein the inbox sorter sends a notification to the appropriate upper MAC engine at a step 540. The notification can have any suitable format and may comprise information such as, for instance, location and size of the received payload. Upon receipt of the notification, the upper MAC engine (e.g., 402) retrieves (at a step 550) the descriptor (e.g., 508) from RXFDQ 506 and retrieves (at a step 560) the corresponding frames from RXQ 502, which it forwards up the layers to the application.

Returning again to FIG. 3, in order for radio 302 to transmit and receive data frames in accordance with the selected communication configuration (e.g., the selected MAC engine) radio 302 needs to be configured in accordance with the selected communication configuration, e.g., via reconfiguration or switching of its channel, modulation, etc. Generally, this will occur during the time frame that access is given to the appropriate lower MAC engine. In one embodiment, the lower MAC engine performs the reconfiguration of the radio to its own specification of parameters. Alternatively, the radio itself or some other entity in the peripheral (e.g., corresponding to configuration blocks 114, 116, 118) may store multiple configurations which are activated by the configuration controller in parallel with the selection of a lower MAC configuration. However, it is not limited to these methods, wherein in yet another embodiment the radio may be programmed by the controller 314 in a centralized (vs. distributed) manner.

In accordance with the 802.11 WLAN embodiment described above by reference to FIG. 3, four interfaces are defined: 1) the interface between the upper MAC engine (e.g., 322) and the lower MAC engine (e.g., 320); 2) the interface between the scheduler (312) and the controller (314); 3) the interface between the controller (314) and the lower MAC engines (324, 334, 344); and 4) the interface between the lower MAC engines and the single radio 302. These interfaces are designed such that each of the plurality of MAC engines (comprised of their respective upper and lower instantiations in software and hardware, respectively) behave as though they have complete and unregulated access to the single radio such that no modification to the TX and RX state machines of said MAC engines is necessary for them to operate over a single radio. This level of abstraction is enabled by the configuration controller which removes the complexities of access from the MAC engines. This abstraction is also embodied within the interface between the upper MAC engine and lower MAC engine, where even though the lower MAC engine might not have access to the radio at a time T, the upper MAC engine is always able to queue frames to the lower MAC engine as though it does have such access. This combination of abstractions is an enabler of SDR. Each of these four interfaces is further described below.

The interface between the upper MAC engine and the lower MAC engine is fully asynchronous. Since the lower MAC engine only has access to the radio as per the scheduler, and since the controller operates in real time to meet the real times requirements of 802.11 and other protocols, it is not feasible that a software implementation of a MAC engine could keep synchronized with the hardware. That is to say that it is undesirable and impractical to attempt to start and pause the upper MAC engine in accord with the lower MAC engine's access to the radio. As such, each upper MAC engine may queue frames to its respective lower MAC engine without regard or care as to whether or not its respective lower MAC engine has or does not have access to the radio.

The interface between the scheduler and configuration controller is such that the scheduler contains all the intelligence about what MAC engines are running on the apparatus and what their unique air interface protocol requirements demand (e.g. beacons, polling, contention periods, etc.). The scheduler computes the most effective utilization of time sharing between the lower MAC engines and the radio and programs the controller with this optimized schedule.

The interface between the controller and lower MAC engines is controlled by the controller which functions as a master to the lower MAC engines, instructing the lower MAC engines when they have access to the radio and for how long based on its programming by the scheduler. The controller then in hardware real-time switches the MAC engines in and out of context. Thus, even though all lower MAC engines share the radio, they need not be aware of one another during their operation as their fair share to the radio is provided for by the configuration controller.

The interface between the lower MAC engines and the radio is many-to-one. Each lower MAC engine, when given access to the radio, may program the radio as per its own configuration (e.g. modulation, TX power, rate, channel, etc.).

FIG. 3 shows an embodiment of the present invention in accordance with the 802.11 wireless protocol. However, the present teachings can be readily applied to any protocols, modulations, configurations, etc. The scheduler in those embodiments would have the awareness of parameters associated with whatever configurations are programmed into a given communication unit in order to use those parameters to generate a configuration schedule for the communication unit in accordance with the teachings herein.

In yet another embodiment, some or all of the functionality of various elements described herein may be stored as processor readable code on a processor readable storage medium for programming a processor in the communication unit to perform steps in accordance with the teachings herein. For example, the processor readable code may program a processor to perform the steps implemented in the configuration controller of: determining a first time frame and during the first time frame, selecting a first communication configuration of a plurality of communication configurations stored in the communication apparatus and controlling the communication apparatus to configure itself to the first communication configuration to at least one of transmit and receive information over the first channel; determining a second time frame that is different from the first time frame and during the second time frame, selecting a second communication configuration of the plurality of communication configurations, and controlling the communication apparatus to configure itself to the second communication configuration to at least one of transmit and receive information over the second channel; and determining the first time frame based on at least a first parameter associated with the first channel, and determining the second time frame based on at least a second parameter associated with the second channel to enable the first and second channels to be simultaneously maintained. The processor readable storage medium may comprise any format including, but not limited to, read-only memory (ROM), random-access memory (RAM), a disk storage medium such as a CD-ROM, a magnetic tape, and an optical data storage device.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising, " "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. Multiple-configuration communication apparatus comprising:

a communication device comprising a single transceiver configured for simultaneously maintaining at least a first channel within a first wireless network and a second channel within a second different wireless network;

a storage device coupled to the communication device for storing a plurality of communication configurations; and a configuration controller coupled to the communication device, the communication controller configured for:

while simultaneously maintaining the first and second channels, also:

determining a first time frame and during the first time frame, selecting a first communication configuration of the plurality of communication configurations and controlling the communication device to configure itself to the first communication configuration to at least one of transmit and receive information over the first channel; and determining a second time frame that is different from the first time frame and during the second time frame, selecting a second communication configuration of the plurality of communication configurations, and controlling the communication device to configure itself to the second communication configuration to at least one of transmit and receive information over the second channel.

2. The communication apparatus of claim 1, wherein the communication apparatus comprises one of a subscriber unit and a base station.

3. The communication apparatus of claim 1 further comprising a first information path coupled to communication device and at least a second information path coupled to the communication device, wherein the configuration controller comprises:

a first portion that selects the first information path during the first time frame and that selects the second information path during the second time frame; and a second portion comprising a single hardware abstraction layer that determines the first time frame based on at least a first parameter associated with the first channel and determines the second time frame based on at least a second parameter associated with the second channel to enable the first and second channels to be simultaneously maintained.

4. The communication apparatus of claim 3, wherein the first parameter is a first inactive mode associated with the first channel and the second parameter is a second inactive mode associated with the second channel.

5. The communication apparatus of claim 1, wherein the first and second communication configurations are in accordance with a wireless protocol.

6. The communication apparatus of claim 5, wherein the wireless protocol is an 802.11 wireless protocol.

7. The communication apparatus of claim 6 further comprising a first Medium Access Control (MAC) engine coupled to the communication device and associated with the first communication configuration and a second MAC engine coupled to the communication device and associated with the second communication configuration.

8. The communication apparatus of claim 7, wherein the first and second MAC engines each comprise an upper MAC portion implemented in software and a lower MAC portion implemented in hardware and coupled between the upper MAC portion and the communication device.

9. The communication apparatus of claim 1, wherein the communication device further comprises an antenna operatively coupled to the transceiver.

10. A method for use in multiple-configuration communication apparatus, the method comprising the steps of:

establishing and simultaneously maintaining a first channel within a first wireless network and at least a second channel within a second different wireless network, using a communication device comprising a single transceiver; and while simultaneously maintaining the first and second channels, also:

determining a first time frame and during the first time frame, selecting a first communication configuration of a plurality of communication configurations stored in the communication apparatus, controlling the communication apparatus to configure itself to the first communication configuration and at least one of transmitting and receiving information over the first channel; and determining a second time frame that is different from the first time frame and during the second time frame, selecting a second communication configuration of the plurality of communication configurations, controlling the communication apparatus to configure itself to the second communication configuration and at least one of transmitting and receiving information over the second channel.

11. The method of claim 10, wherein the first and second time frames are determined using a scheduling algorithm based on at least a first parameter associated with the first channel and a second parameter associated with the second channel.

12. The method of claim 11, wherein the first parameter is a first inactive mode associated with the first channel and the second parameter is a second inactive mode associated with the second channel.

13. The method of claim 10, wherein selecting a first communication configuration comprises selecting a first Medium Access Control (MAC) engine, and selecting a second communication configuration comprises selecting a second MAC engine.

14. The method of claim 10, wherein selecting a first communication configuration comprises selecting a first information path, and selecting a second communication configuration comprises selecting a second information path.

15. The method of claim 10, wherein the first communication configuration is associated with a first wireless protocol and the second communication configuration is associated with a second wireless protocol.

16. The method of claim 15, wherein at least one of the first and second wireless protocols is an 802.11 wireless protocol.

17. The method of claim 10 further comprising the step of queuing information transmitted from and received to the communication apparatus over the first and second channels independent of determining the first and second time frames.

18. A processor readable storage medium containing processor readable code for programming a processor to perform a method for use in multi-configuration communication apparatus, the method comprising the steps of:

establishing and simultaneously maintaining a first channel within a first wireless network and at least a second channel within a second different wireless network, using a communication device comprising a single transceiver; and while simultaneously maintaining the first and second channels, also:

determining a first time frame and during the first time frame, selecting a first communication configuration of a plurality of communication configurations stored in the communication apparatus and controlling the communication apparatus to configure itself to the first communication configuration to at least one of transmit and receive information over the first channel; and determining a second time frame that is different from the first time frame and during the second time frame, selecting a second communication configuration of the plurality of communication configurations, and controlling the communication apparatus to configure itself to the second communication configuration to at least one of transmit and receive information over the second channel.

19. The processor readable storage medium of claim 18, wherein the medium comprises one of: read-only memory (ROM), random-access memory, a disk storage medium, a magnetic tape, and an optical data storage device.

20. The processor readable storage medium of claim 18 further programming the processor to perform the steps of determining the first time frame based on at least a first parameter associated with the first channel, and determining the second time frame based on at least a second parameter associated with the second channel to enable the first and second channels to be simultaneously maintained.

* * * * *

UNITED STATES PATENT AND TRADEMARK OFFICE

CERTIFICATE OF CORRECTION

PATENT NO. : 7,724,702 B2
APPLICATION NO. : 11/303492
DATED : May 25, 2010
INVENTOR(S) : Silverman et al.

It is certified that error appears in the above-identified patent and that said Letters Patent is hereby corrected as shown below:

IN THE SPECIFICATION

1. In Column 3, Line 9, delete “modem” and insert -- modern --, therefor.

Signed and Sealed this
Fifteenth Day of May, 2012

David J. Kappos
*Director of the United States Patent and Trademark Office*